United States Patent
Fahldieck

(10) Patent No.: US 8,833,543 B2
(45) Date of Patent: Sep. 16, 2014

(54) STAR WHEEL HAVING A DRIVE FOR INSTALLATION IN BOTTLE HANDLING SYSTEMS

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 402 days.

(21) Appl. No.: 13/145,834

(22) PCT Filed: Dec. 18, 2009

(86) PCT No.: PCT/EP2009/009114
§ 371 (c)(1),
(2), (4) Date: Jul. 22, 2011

(87) PCT Pub. No.: WO2010/108531
PCT Pub. Date: Sep. 30, 2010

(65) Prior Publication Data
US 2011/0272255 A1    Nov. 10, 2011

(30) Foreign Application Priority Data
Mar. 26, 2009 (DE) .......... 10 2009 014 405

(51) Int. Cl.
*B65G 29/00* (2006.01)
*B65G 47/86* (2006.01)
*B08B 9/32* (2006.01)
*B67C 7/00* (2006.01)
*B67C 3/24* (2006.01)
*B08B 17/00* (2006.01)

(52) U.S. Cl.
CPC .............. *B67C 3/242* (2013.01); *B65G 47/847* (2013.01); *B08B 9/32* (2013.01); *B65G 2207/26* (2013.01); *B65G 29/00* (2013.01); *B67C 7/0053* (2013.01); *B08B 17/00* (2013.01)
USPC ................. 198/478.1; 198/459.2; 198/480.1; 198/481.1

(58) Field of Classification Search
USPC .......... 198/478.1, 479.1, 480.1, 481.1, 473.1, 198/459.2
See application file for complete search history.

(56) References Cited

U.S. PATENT DOCUMENTS

| | | | | |
|---|---|---|---|---|
| 3,225,889 A * | 12/1965 | West | ........................ | 198/478.1 |
| 3,342,314 A * | 9/1967 | Holbrook | ................... | 198/481.1 |
| 4,539,792 A * | 9/1985 | Zamboni | ................... | 198/478.1 |
| 5,551,491 A | 9/1996 | Baruffato et al. | | |
| 5,607,045 A * | 3/1997 | Hermann Kronseder | . | 198/479.1 |
| 7,743,907 B2 | 6/2010 | Weinbrenner et al. | | |
| 2002/0081189 A1 | 6/2002 | Giometti | | |
| 2004/0007438 A1 * | 1/2004 | Baranowski | ............... | 198/459.2 |

FOREIGN PATENT DOCUMENTS

| | | |
|---|---|---|
| DE | 10157918 | 6/2002 |
| DE | 20203781 | 7/2003 |
| DE | 10247362 | 4/2004 |
| DE | 102005014478 | 10/2005 |
| DE | 202005002470 | 12/2005 |
| EP | 0939044 | 9/1999 |

(Continued)

*Primary Examiner* — Leslie A Nicholson, III
(74) *Attorney, Agent, or Firm* — Occhiuti & Rohlicek LLP

(57) ABSTRACT

The invention relates to a star wheel having a drive, for installation in bottle filling system or the like, in particular in the wet area for empty PET bottles, having as hygienic a design as possible and having the corresponding machine components being used here. The aim is achieved in that the star (1) comprises a centric, cone-shaped, plate (4) attached by means of a screw (5).

14 Claims, 2 Drawing Sheets

(56) References Cited

FOREIGN PATENT DOCUMENTS

Figure 1:
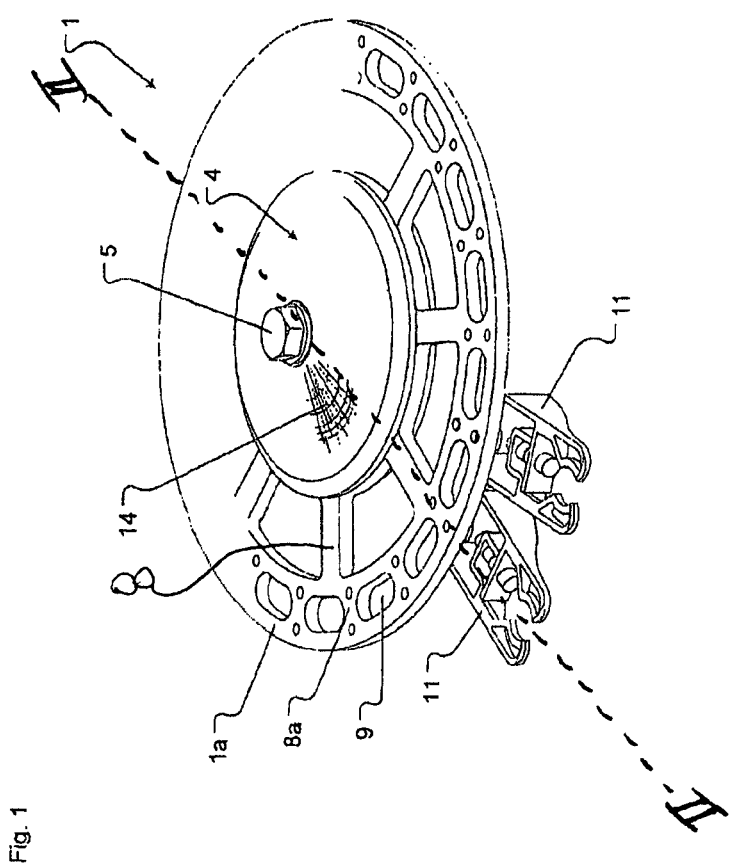

| | | |
|---|---|---|
| EP | 1050508 | 11/2000 |
| EP | 1281661 | 2/2003 |
| EP | 1342678 | 9/2003 |
| FR | 2867171 | 9/2005 |
| WO | 2008/129347 | 10/2008 |

\* cited by examiner

STAR WHEEL HAVING A DRIVE FOR INSTALLATION IN BOTTLE HANDLING SYSTEMS

CROSS-REFERENCE TO RELATED APPLICATIONS

This application is the National Stage of International Application No. PCT/EP2009/009114, filed on Dec. 18, 2009, which claims the benefit of the Mar. 26, 2009 filing date of German Patent Application No. 10 2009 014 405.6. The contents of both applications are hereby incorporated by reference in their entirety.

The invention relates to a star wheel having a drive, for installation in bottle filling systems or the like, of the type indicated in the preamble of claim 1.

In bottle filling systems, in corresponding rinsing systems and the like, there are a number of star wheels by means of which the bottles are conveyed from one position to another, such as for example a star wheel in the wet area for empty PET bottles, in rinsers, in fillers for unpressurised fillings, in direct hardening systems with a star wheel after a blow molding machine and the like. Efforts are being made to configure the construction in such a way that hygienic and trouble-free operation is possible, i.e. in such a way that in particular all the machine elements can be easily cleaned and are as unsusceptible to soiling as possible.

The aim of the present invention is therefore to provide as hygienic a design as possible for these corresponding machine parts used here.

With a star wheel of the type described above, this object is achieved according to the invention in that the star wheel comprises a centric, cone-shaped plate fixed by a screw.

The cone-shaped design of the plate that fixes the star wheel has a number of advantages since horizontal surfaces are minimized. The design may be such that corners and edges that are difficult to clean are also avoided.

Embodiments of the invention will become apparent from the dependent claims.

It may be provided that the centric, cone-shaped plate is attached to the drive element by a centric through-screw. By virtue of the centric, cone-shaped central attachment by just one screw, the assembly effort is also considerably lower than in systems used to date.

According to the invention, the plate may also be fixed to the drive element by a concealed anti-rotation means. This, too, leads to a simple structure and to simple assembly involving a small number of components.

The invention also provides that a metal seal is provided between the plate and the support part on the drive, wherein, in an additional embodiment according to the invention, it may be provided that at least the cone-shaped plate is equipped with a bacteriostatic surface, such as for example a silver-containing or copper-containing coating.

Finally, the invention also provides that the radial webs are equipped with in each case two smooth, downwardly pointing bolts which serve as supports for clips. By virtue of this configuration, an easily cleanable attachment to the star wheel with no dirt-collecting corners is provided; the clips on the star wheel can be positioned in such a way that the star wheel can also be rinsed with the clips.

Of particular advantage is a variant in which the star wheel in the form of a carrier wheel has at least one ring and a plurality of spokes, or the ring is a double ring connected via webs. The holding clips for transporting the containers or bottles are attached to the at least one outer ring or to the webs of the double ring. In this case, this wheel is held and fixed via the central plate and the anti-rotation means. The particular advantage lies in the fact that such a star wheel has only a very small surface on which liquid can adhere and remain. On the other hand, the wheel can be made in one piece very easily and inexpensively by means of a physical or mechanical cutting process. This star wheel or the wheel can be improved by providing as many openings as possible in the region of the spokes or of the at least one wheel, in so far as the mechanical/static requirements will allow.

Figure 2:
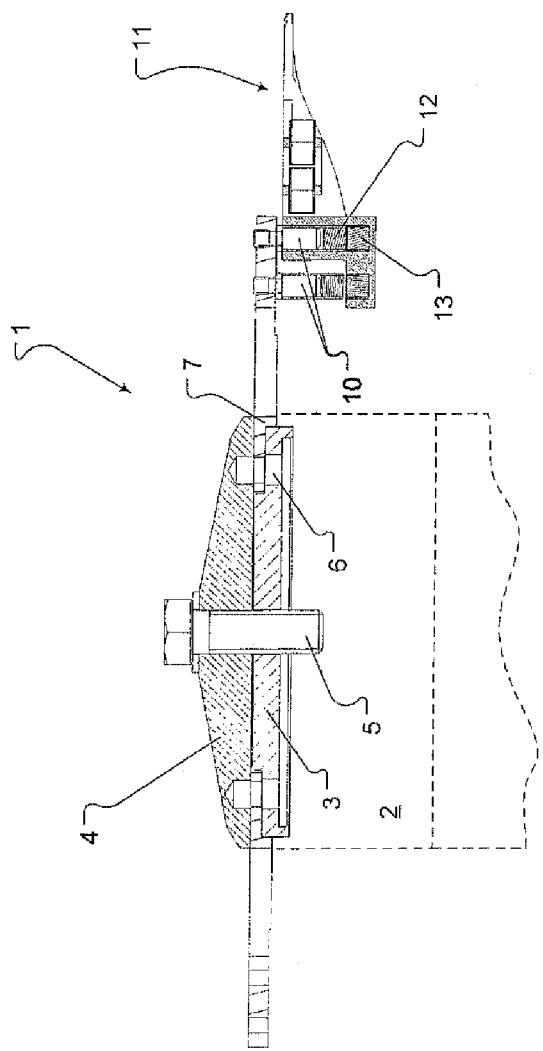

Further details, features and advantages of the invention will become apparent on the basis of the following description and with reference to the drawing, in which:

FIG. 1 shows a three-dimensional view of the star wheel according to the invention with installed clips, and FIG. 2 shows a sectional view approximately along line II-II in FIG. 1.

The star wheel, which is shown in partially simplified form in the figures and is generally denoted by 1, is fixed to a drive element 3 on a drive 2 (merely indicated in dashed line) of a corresponding machine by means of a cone-shaped plate 4. The plate 4 is attached to the drive element 3 only by a centric screw, denoted generally by 5. Provided between the drive element 3 and the plate 4 is a concealed anti-rotation means 6 and a seal or a metal ring 7 which replaces a seal.

As can be seen in particular from FIG. 1, the star wheel 1 has at least one outer ring 1a which is fixed to the inner region by means of spokes 8 and is provided with a plurality of elongate holes 9, between which spoke-like webs 8a are formed.

On its underside, downwardly pointing bolts, denoted generally by 10, are provided on the webs 8a between the cutouts 9, said bolts serving in pairs to fix and center holding clips 11 (shown only schematically in the figures) for bottles (not shown).

As can be seen, the star wheel according to the invention consists of a small number of easily cleanable elements which are likewise easy to assemble. This also applies to the clips 11, since the bolts 10 attached to the star wheel 1 are equipped with magnets which interact with corresponding magnets of opposite polarity on or in the clips. This pair of magnets, which in each case correspond to one another, is denoted by 12 and 13 in FIG. 2.

It is also indicated in FIG. 1 that the surface at least of the centric plate 4 which serves for fixing purposes may be equipped with a bacteriostatic coating, generally denoted by 14, such as for example a silver coating or the like applied by vapor deposition.

Of course, the described example of embodiment of the invention can be further modified in many ways without departing from the basic concept. For instance, the star wheel may also have a somewhat different design; what is essential is that it is easy to clean and easy to assemble.

The invention claimed is:

1. An apparatus for installation in a wet area for empty PET bottles in a bottle filling system, said apparatus comprising a star wheel, said star wheel comprising a drive element, radial spokes, at least a first ring carried by said radial spokes, and a centric, cone-shaped plate fixed by a screw, wherein the plate is fixed to the drive element by a concealed anti-rotation means, wherein the spokes carry at least said first ring and a second ring, said first and second rings being connected via a plurality of radial webs, and wherein the at least one ring and the spokes and/or webs form part of a carrier wheel, the carrier wheel including a central holding area or ring that is at least partially covered by the centric plate in the installed state.

2. The apparatus of claim 1, wherein the centric, cone-shaped plate is attached to the drive element by said screw, wherein said screw is a centric-through-screw.

3. The apparatus of claim 1, further comprising a seal provided between the plate and a support part on the drive element.

4. The apparatus of claim 3, wherein the seal comprises a metal seal.

5. The apparatus of claim 1, further comprising a bacteriostatic surface provided on the cone-shaped plate.

6. The apparatus of claim 5, wherein the bacteriostatic plate comprises a silver-containing coating.

7. The apparatus of claim 5, wherein the bacteriostatic surface comprises a copper-containing coating.

8. The apparatus of claim 1, further comprising radial webs on the star wheel, each of said radial webs being equipped with two smooth, downwardly pointing bolts that serve as supports for clips.

9. The apparatus of claim 8, wherein the radial webs have one or more openings or material cutouts.

10. The apparatus of claim 1, wherein the at least one ring connected via a plurality of radial spokes comprises a plurality of openings or material cutouts.

11. The apparatus of claim 1, wherein the carrier wheel consists of one piece.

12. The apparatus of claim 11, wherein the carrier wheel is manufactured from one piece.

13. The apparatus of claim 11, wherein the carrier wheel is manufactured with no soldered or welded joints.

14. An apparatus for installation in a wet area for empty PET bottles in a bottle filling system, said apparatus comprising a star wheel, said star wheel comprising a drive element, radial spokes, at least a first ring carried by said radial spokes, and a centric, cone-shaped plate fixed by a screw, wherein the plate is fixed to the drive element by a concealed anti-rotation means, and a bacteriostatic surface provided on the cone-shaped plate, wherein the bacteriostatic surface comprises a copper-containing coating.

* * * * *